United States Patent [19]

Goltz

[11] 3,998,445
[45] Dec. 21, 1976

[54] CLAMPING FIXTURE
[76] Inventor: Richard Goltz, Grundweg 2, D-7123 Sachsenheim 2, Germany
[22] Filed: Nov. 28, 1975
[21] Appl. No.: 635,855
[30] Foreign Application Priority Data
Dec. 21, 1974 Germany .......................... 2460833
[52] U.S. Cl. ........................... 269/258; 269/321 N
[51] Int. Cl.² ........................................ B25B 1/24
[58] Field of Search .......... 269/270, 265, 258, 259, 269/264, 275, 321 N

[56] References Cited
UNITED STATES PATENTS
113,656   4/1871   Harwood ........................... 269/259
1,326,804  12/1919  Taylor ............................... 269/258

FOREIGN PATENTS OR APPLICATIONS
1,256,146  2/1960   France ........................... 269/321 N
1,158,910  12/1963  Germany .......................... 269/258

Primary Examiner—Al Lawrence Smith
Assistant Examiner—Robert C. Watson

[57] ABSTRACT

A clamping fixture for rectangular workpieces is formed by a pair of oppositely directed cylindrical chuck jaws, each mounted so as to be freely rotatable about a longitudinal axis. Each of the chuck jaws has a cut-out sector extending along its length, which forms a seat for the workpiece and which is defined by a pair of extending surfaces set at right angles to each other and intersecting in a common edge extending co-axially with the axis of rotation of the chuck jaws. Each of the chuck jaws is provided with a longitudinal slot extending inwardly from the intersection of the seat surface and terminating short of the opposite wall, so as to provide an integral web connecting the seat surfaces.

9 Claims, 2 Drawing Figures

CLAMPING FIXTURE

BACKGROUND OF THE INVENTION

The present invention relates to a fixture for clamping rectangular workpieces and/or tools.

Clamping fixtures for rectangular tools and/or workpieces are known which consist of two oppositely directed, approximately semi-cylindrical rotatable chuck jaws, which are moveable toward and away from each other by exterior supporting blocks and collets. Each of the chuck jaws is mounted so as to rotate in an arc of about 180° about a longitudinal axis, set at right angles to the direction of compression of the supporting blocks. Each of the chuck jaws is provided with a seat in which the workpiece is received. The seat is defined by two clamping surfaces set at right angles to one another which intersect in a common edge running longitudinally parallel to but offset from the axis of rotation of the chuck jaw.

Such a clamping fixture is generally found in British Pat. No. 960,684. The clamping jaws of this fixture are secured by retaining springs in the collets, so that the latter can only perform a slight rotary movement. This fixture is therefore only suitable for clamping square workpieces. However, if the range of rotation of the clamping jaws within the supporting collets is increased, it is possible to set up some rectangular pieces, provided they have sides of approximately the same dimensions. Notwithstanding, since the axis of rotation of each of the clamping jaws lies outside the intersecting edge of the two surfaces forming the clamping seat, the setting up of even such limited rectangular workpieces results in placing the diagonal of the workpiece offset from the direction of compressive movement or adjustment produced by the shifting of the supporting blocks. Thus, the direction of the clamping force on the workpiece does not coincide with the diagonal and this in turn leads to non-symmetrical force reactions. Consequently, the precise positioning of the workpiece being set up, is in all cases severely impaired.

It is the object of the present invention, to provide an improved clamping fixture overcoming the disadvantages of the prior art and one in which rectangular workpieces and/or tools can be precisely clamped.

It is another object of the present invention, to provide improved clamping fixture, by which rectangular workpieces or tools, having different facial dimensions and side ratios of different values, can be mounted, so that notwithstanding these differences, their diagonals would be always aligned parallel to the clamping direction.

It is still another object of the present invention, to provide a clamping fixture which provides for a symmetrical transfer of the clamping forces to rectangular workpieces or tools and by which each subsequent workpiece or tool can be set up in exactly the same manner.

The foregoing objects, together with other objects and advantages of the present invention, will be obvious from the following disclosure.

SUMMARY OF THE INVENTION

According to the present invention, a clamping fixture for rectangular workpieces and/or tools is provided, comprising a pair of oppositely directed cylindrical chuck jaws, each mounted so as to be freely rotatable about a longitudinal axis. Each of the chuck jaws has a cut-out sector extending along its length, which forms a seat for the workpiece and which is defined by a pair of extending surfaces set at right angles to each other intersecting in a common edge extending co-axially with the axis of rotation of the chuck jaws. Each of the chuck jaws is provided with a longitudinal slot extending inwardly from the intersection of the seat surface and terminating short of the opposite wall, so as to provide an integral web connecting the seat surfaces.

Preferably each clamping jaw is seated to be freely rotatable in an interiorly semi-cylindrical collet which is fastened to an outer supporting block translatable toward and away from each other in known manner, thereby permitting rotative adjustment and compressive clamping at the same time.

The foregoing objects, for clamping rectangular workpieces and/or tools having sides of uneven length, is achieved according to the present invention by the fact that the axes of rotation of the chuck jaws run co-axially with the intersecting edge of the seat surfaces, and that the chuck jaws have a slot extending from the seat toward the opposite wall. The small strip or web remaining between the end of the slot and the outer surface of the chuck jaws provides an integral flexible connection which allows the seat to spread apart to conform to the dimensions of the workpiece or tools, of different side ratios, can always be set up so that their diagonals remain aligned with the direction of adjustment (i.e. compression) of the chuck jaws.

As a result of the symmetrical transference of the clamping force the smallest possible tolerances can be obtained, utilized and maintained even with repeated setting up of workpieces.

The slot makes the chuck jaws a kind of variable chuck, which becomes wider when the surfaces of the seat are stressed and thus deflects and deforms the outer periphery of the chuck jaw. This deflection results in the formation of three bearing edges (i.e. longitudinal lines) relative to the surrounding collet. These three bearing edges lie on the one hand facing in the clamping direction of the collet and are directed approximately at right angles to the center of the seat surfaces on the peripheral area of the chuck jaws. When the workpiece is set up, the chuck jaw is therefore clearly supported in the surrounding collet and is moreover fixed so as to be non-rotatable by action of the clamping force components and vectors that occur in this triangular array of bearing edges. However, after removal of the clamping pressure, that is the slackening of the clamping fixture, the deflection of the chuck jaws recedes and they return to their more circular nature, so that it becomes freely rotatable once again within the surrounding collet.

In order to guide the chuck jaws accurately and definitely in the collet, provision is made for them to be axially non-displaceable, although being maintained rotatable. This is accomplished by providing a radial pin extending from the peripheral exterior surface of the chuck jaw into an arcuate groove formed in the interior face of the coordinated or associated collet. As a result, the chuck jaw can therefore be easily inserted in the collet, which preferably extends over more than 180° of the periphery of the chuck jaw and therefore secures it accurately and assuredly by allowing it to be freely rotatable but axially not movable.

According to the preferred embodiment of the present invention provision is made so that the diameter of the cut-out sector forming the seat, in the area of the longitudinal intersecting clamping edge, is equal to the width of the slot. The formation of the cut-out sector, and the diametric slot, can be formed in the chuck jaw in a single machine operation.

The attachment of the collet in the supporting block may, according to the present invention be obtained by extending screws through countersunk holes formed in the collets into threaded bores formed on the blocks. This attachment of screws does not interfere with the freedom of movement of the chuck jaw in the collet, since the head of the bolts or screws are countersunk out of the way of the rotatable chuck jaw.

Full details of the present invention are set forth in the following description and are illustrated in the accompanying drawing.

DESCRIPTION OF THE INVENTION

Figure 1:
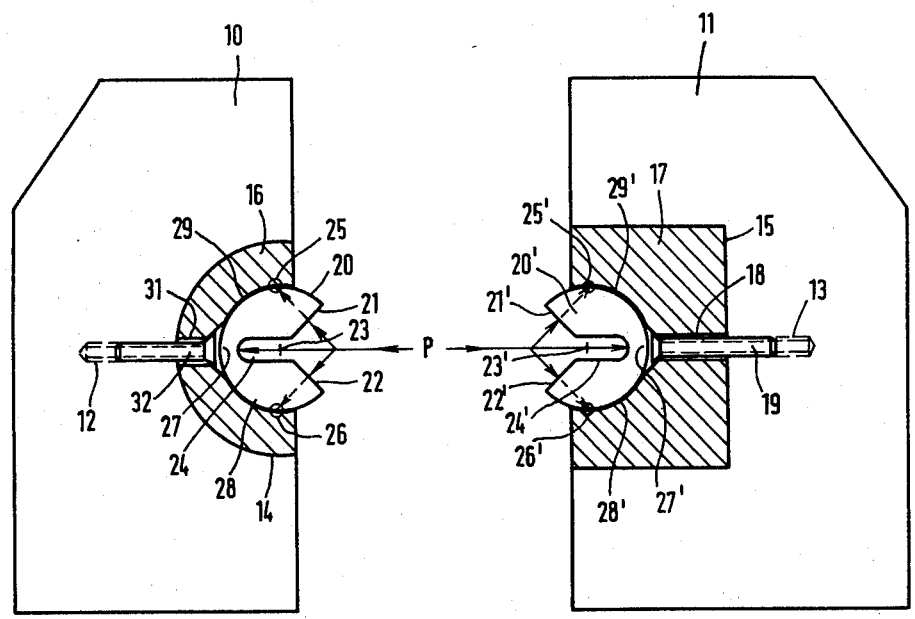
FIG. 1 is a vertical section through each of the two opposed chuck jaws, with surrounding collets and supporting blocks.

Turning to FIG. 1 the present invention is embodied in apparatus adapted to be located in a conventional vise lathe, or other machine tool and includes a pair of supporting blocks or chuck halves 10 and 11 which are conventionally mounted so as to be rotatable and adjustably movable toward and away from each other in order to selectively apply a compressive clamping force on a workpiece located therebetween. The mounting of the blocks 10 and 11 is conventional and follows well known principles so that details thereby need not be set forth herein.

In the face of one of the support blocks, here shown to be the left one, indicated with the numeral 10, an elongated recess 14 of substantially semicircular cross section, is formed into which a semi-cylindrical dish shaped collet 16 is secured by the use of suitable screws 32 which pass through radial countersink bores 31 into a threaded bore 12 formed in the supporting block 10.

The collet 16 has an interior semicircular surface 29 which perferably extends over an arc of approximately 180°. A cylindrical chuck jaw 20 having an exterior circular surface 28 generally conforming to that of the surface 29 is seated within the collet 16 so as to be freely rotatable with respect to it about a longitudinal axis 23. The chuck jaw 20 extending over a circular arc of approximately 270°, has a portion protruding from the face of the collet 16, which is provided with a longitudinal cut-out sector defined by a pair of wall surfaces 21 and 22 extending at right angles to each other, which if elongated would intersect through the axis of rotation 23. The cut-out sector forms a seat, for receiving the corner edges of the rectangular workpiece and/or tool.

The seat surfaces 21 and 22 terminate within a longitudinal slot 24 passing symmetrically through the center 23 along a diametric plane. Preferably, the slot 24 is of uniform width and equal to the diameter of the recessed cut-out at the intersection of the surfaces 21, 22. The slot 24 extends almost as far as the outer peripheral surface 28 of the chuck jaw, terminating in a rounded end just short of outer periphery to provide a narrow connecting web integrally connecting what would otherwise be two seat halves.

In much the same manner the second supporting block 11 is provided with a chuck jaw 20' freely rotatable in a collet 17, a cross sectional configuration of which, however, as illustrated is rectangular rather than circular and is attached in the corresponding recess 15 by means of countersunk screws 19 passing through radial holes 18 into bores 13. The chuck jaw 20' is provided with a right angle longitudinal cut-out sector defined also be surface 21' and 22' set at right angles to each other, the extensions of which pass through the center 23' of rotation of the jaw 20'. A slot 24' is likewise formed in jaw 20', passing through the cut-out sector and the chuck jaw symmetrically to the central axis of rotation 23', terminating just short of the opposite wall to again provide a narrow web integrally connecting the sea surfaces.

In a form of the present invention it may be desirable to locate the axis of rotation 23 coincident with the cross sectional center of the clamping jaws. The seat surfaces 21 and 22 may be radial and therefore their intersection will be at the center. In this form the slot 24 will extend diametrically.

Figure 2:
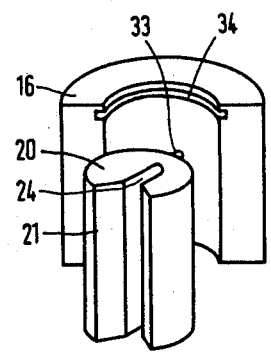
FIG. 2 is a perspective view of the chuck jaw and associated collet.

Because the jaws 20 and 20' are identical, FIG. 2 serves to illustrate both.

In operation, when a rectangular workpiece is set up between the two opposed chuck jaws 20 and 20' the jaws are twisted, i.e., rotated in their respective collets 16 and 17 so that the adjacent faces of the rectangular workpiece on diagonally opposite sides thereof engage the seat surfaces 21, 22 and 21' and 22' and the diagonal of the workpiece formed by the angular disposition of the surfaces lies in the plane of the slots 24 and 24' and thus pass through the two axes of rotational 23 and 23'. By closing the supporting blocks 10 and 11 toward each other, a clamping force is exerted on the workpiece in the plane coinciding with the axes 23, 23', the counterforce vectors being indicated by the arrows P in the drawing. Resultant force vectors are applied directly by the workpiece against the perpendicularly disposed faces 21, 22 and 21' and 22'. As indicated by the arrows in the drawing, these forces lie on the peripheral surface of the chuck jaw, on the one hand along a line passing through the plane of the axes of rotation and facing away from the clamping direction and on the other hand along lines directed at approximately right angles to and at the center of the seat surface.

The clamping force is thus divided in such a way that the chuck jaws 20 and 20' are each flexed about the central web portion so that the exterior peripheral surfaces of the jaw 20 rests on three triangularly spaced bearing edges 25, 26 and 27 while the exterior surface of the jaw 20' rests on the bearing edges 25', 26' and 27', with regard to the respective collets 16 and 17. As will be seen, these bearing edges extend longitudinally along the respective collet and jaws and are defined by the force vectors created by the work piece set in the chuck jaws acting at right angles to the surfaces 21 and 22, 21' and 22' and along the common force vector created by the relative compression of the supporting blocks 10 and 11. Because the integral webs, adjacent the bearing point 27 is relatively narrow, the chuck jaws can flex or pivot hingedly under the force applied against both faces 21 and 22, 21' and 22', respectively to accomodate varying sized rectangular shapes while maintaining the diagonal thereof along the rotational axis plane. Because the chuck jaws 20 and 21' are slightly deflected in the foregoing manner, they become braced by the interaction of the surfaces 28, 28' and 29, 29' with their respective collets 16 and 17. As a result each of the chuck jaws 20 and 21' is therefore supported on a triangular array on three definite bearing edges extending in parallel along the length of the cylindrical configuration. Consequently each chuck jaw 20 and 20' is fixed non-rotatably within its respective collets and because of the symmetrical application of the force vectors along perpendicular lines, the chuck jaws 20 and 20' and the collets 16 and 17 are uniformly loaded even if dissimilar or uneven machining forces act upon the workpiece.

As a result the clamping precision of the fixture according to the present invention is extremely great and does not vary even after long periods of use. This is attributed to the intersection of the clamping seat surface 21, 22 and 21' and 22' with the central axis of rotation, and the arrangement of the slot 24, 24' which permit the chuck jaws 20, 20' to flex, giving them the property of a variable chuck.

After the compression forces are removed from the supporting blocks and the clamping devices slackened, the chuck jaws 20 and 20' reflex and assume their more circular cross section and they may be again rotated freely within the collets 16 and 17, and workpieces freely exchanged.

The chuck jaws 20 and 20' can be fixed against axial movement relative to their supporting collets. As seen in FIG. 2 a radially extending pin 33 protrudes from the outer surface from the chuck jaw into a groove 34 extending arcuately in a plane perpendicular to the central axis of rotation. As a result the jaw can rotate freely with respect to the collet about the full range of movement permitted by the collet while being prevented from moving axially with respect thereto.

The various objects and advantages set forth in the introduction hereto together with the others mentioned in the disclosure are all satisfied by the present invention.

In particular the present invention provides a fixture in which varying sized rectangular workpieces can be easily clamped, and wherein the diagonal of the workpiece is maintained in a plane coincident with the axes of rotation and with the line of the compressive clamping force. Moreover, the forces on the workpieces are applied symmetrically and uniformly and therefore no impairment of precision occurs.

It will also be appreciated that various modifications and changes can be made in the exact form of the present invention without departing from the scope thereof. It is accordingly intended that the disclosure be taken as illustrative only and not limiting of the scope.

What is claimed is:

1. A fixture for clamping rectangular workpieces and/or tools comprising a pair of oppositely directed supports movable toward and away from each other, a cylindrical chuck jaw located in each support and freely rotatable about a longitudinal axis of rotation with respect to said support each of said chuck jaws having a cut-out sector extending along its length defined by a pair of surfaces set at right angles to each other to intersecting in a common edge coaxial with the axis of rotation and a radially directed slot extending inwardly through said jaw from the intersecting clamping surfaces terminating short of the peripheral wall of said jaw opposite said cut-out sector.

2. The fixture according to claim 1 wherein each of said chuck jaws are supported in a collet, the outer periphery of said chuck jaw and the inner periphery of said collet having a circular cross section of substantially conforming diameter.

3. The fixture according to claim 1 wherein said slot extends in a plane coaxially with the axis of rotation.

4. The fixture according to claim 1 wherein the portion of said chuck jaw opposite the end of said slot forms an integral flexible web connecting the surfaces defining the cut-out sector.

5. The fixture according to claim 1 wherein the respective chuck jaws and collets are provided with means for preventing relative axial movement therebetween.

6. The fixture according to claim 5 wherein said means for preventing axial movement comprises a radially extending pin secured to the exterior surface of said chuck jaw and a cooperating groove for receiving the pin formed within the inner surface of said collet in a plane perpendicular to the axis of rotation.

7. The fixture according to claim 1 wherein the diameter of recess in the area of the clamping surfaces corresponds equally to that of the slot.

8. The fixture according to claim 1 wherein the collets are attached securely to the supporting blocks, the attachments comprising screws extending through holes within the collets and received within threaded bores formed in the supporting blocks, said holes within said collets as being countersunk to receive the heads of such screws.

9. The fixture according to claim 1, wherein said surfaces defining said cut-out surfaces extend radially and intersect along the central axis of said chuck jaw.

* * * * *